July 12, 1966  A. WELTI  3,260,478
METHOD AND MEANS FOR CONTROLLING TRAVEL MOTION OF AN OBJECT IN
DEPENDENCE UPON THE POSITION OF ANOTHER OBJECT
Filed Aug. 20, 1963  7 Sheets-Sheet 1

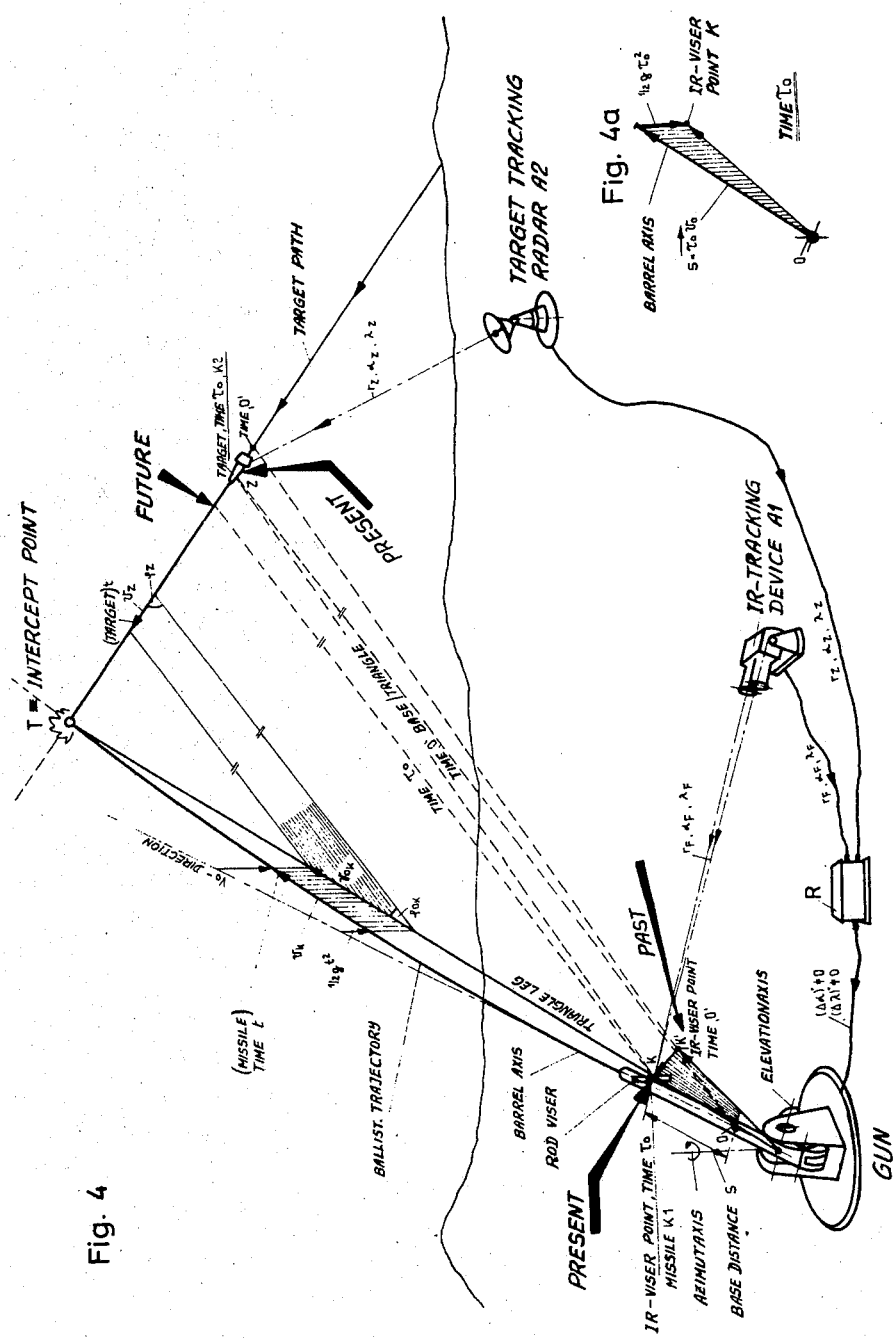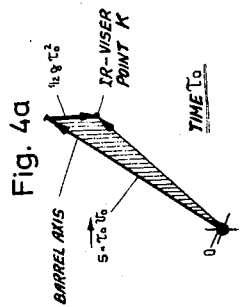

United States Patent Office 3,260,478
Patented July 12, 1966

3,260,478
METHOD AND MEANS FOR CONTROLLING TRAVEL MOTION OF AN OBJECT IN DEPENDENCE UPON THE POSITION OF ANOTHER OBJECT
Arno Welti, Zurich, Switzerland, assignor to Albiswerk Zurich A.G., Zurich, Switzerland, a Swiss corporation
Filed Aug. 20, 1963, Ser. No. 303,383
Claims priority, application Switzerland, Aug. 30, 1962, 10,324/62
10 Claims. (Cl. 244—14)

My invention relates to method and means for controlling the travel motion of a first object in dependence upon the position of a second object, preferably for guidance of the first object on a collision or anti-collision course. In one of its more particular, though not exclusive aspects, the invention relates to the remote control of missiles or flying craft relative to a moving target.

Known ultra-stable guidance methods require very complicated computations and still fail to secure collision or anti-collision under exacting circumstances with satisfactory reliability.

It is an object of my invention to devise an improved method and improved equipment of the above-mentioned type that combines versatile applicability with relative simplicity and augmented reliability.

To this end, and in accordance with my invention, I supply to a regulating (feedback-control) system for controlling the travel of the object to be guided, the position information of the second object to serve as the variable datum or reference input (controlling variable quantity), and I supply to the same feedback-control system the position information of the first object to serve as the pilot magnitude (controlled variable quantity). I further derive, as the output magnitude of the regulating system, the time-dependent changes or rate of change of the differences betwen the angular coordinates of the second object and the angular coordinates of the first object. In conjunction therewith, I apply a time delay to at least one of the position informations in dependence upon a magnitude proportional to the time change (rate of change) of the quotient of the distance information of the two objects. I supply the regulator output magnitude to the travel control member of the first object, said control member forming part of the forward path of the feedback-control system that may also be influenced by a disturbance, i.e. any additional controlling input quantity that takes external disturbances into account as may result from gravity, wind, magnetic or coriolis forces.

According to further, more specific features of my invention, I provide the travel control system with sensing devices for detecting and transducing of the position information from both objects that are to be utilized for traval regulation of the first object, and I connect with these devices, hereinafter called "data input devices" or briefly "sensors," at least one memory, storage or storer member for time-controllable storage of the position information from at least one of the two objects, and a circuit device for controlling the storage time in the memory member or members in dependence upon a magnitude proportional to the time-dependent change of the quotient of the respective distance informations from the two objects. I further connect to the just-mentioned components a command signal stage for the generation of signals indicative of the time-dependent changes of angle differences $\alpha_Z - \alpha_F'$, $\alpha_Z' - \alpha_F$ or $\alpha_Z' - \alpha_F'$ and $\lambda_Z - \lambda_F'$, $\lambda_Z' - \lambda_F$ or $\lambda_Z' - \lambda_F'$, wherein $\alpha_F'$, $\lambda_F'$ denote the angular coordinates of the first object drawn from the memory stage, and $\alpha_Z'$, $\lambda_Z'$ denote the corresponding angular coordinates of the second object, these signals serving as the commands for the travel control member of the first object.

The invention will be further described with reference to the accompanying drawings, in which:

FIG. 4 is an explanatory diagram relating to the function of the method and equipment according to the invention applied to a specific example of use.

FIG. 4a is an explanatory vector diagram relating to FIG. 4.

Figure 1:
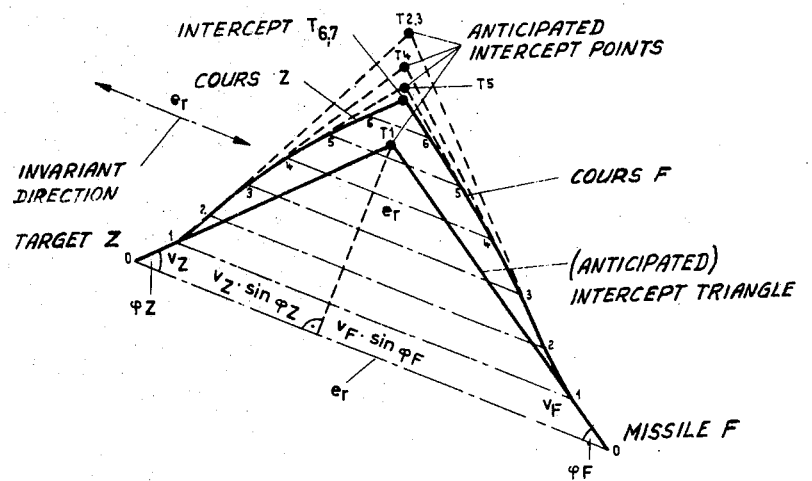
FIG. 1 is an explanatory diagram of the intercept-triangle type.

The intercept diagram according to FIG. 1 permits deriving the general condition for collision, namely the requirement that the difference between the instantaneous velocity vectors of a defensive object such as a missile ($v_F$) and those of a moving target ($v_Z$) must be regulated relative to the instantaneous height of the instantaneous collision triangle to be equal to zero at each moment. That is, the following equation must remain satisfied:

$$v_Z \cdot \sin \varphi_Z - v_F \cdot \sin \varphi_F = 0$$

This condition is an invariance requirement; its feature is the invariant zero. For achieving collision of a target Z and a flying object or missile F, the information vectors Z ($r_Z$, $\alpha_Z$, $\lambda_Z$) and F ($r_F$, $\alpha_F$, $\lambda_F$) are to remain continuously correlated, with respect to their component signals, to the invariant of the collision condition at the instantaneous intercept triangle.

Figure 2:
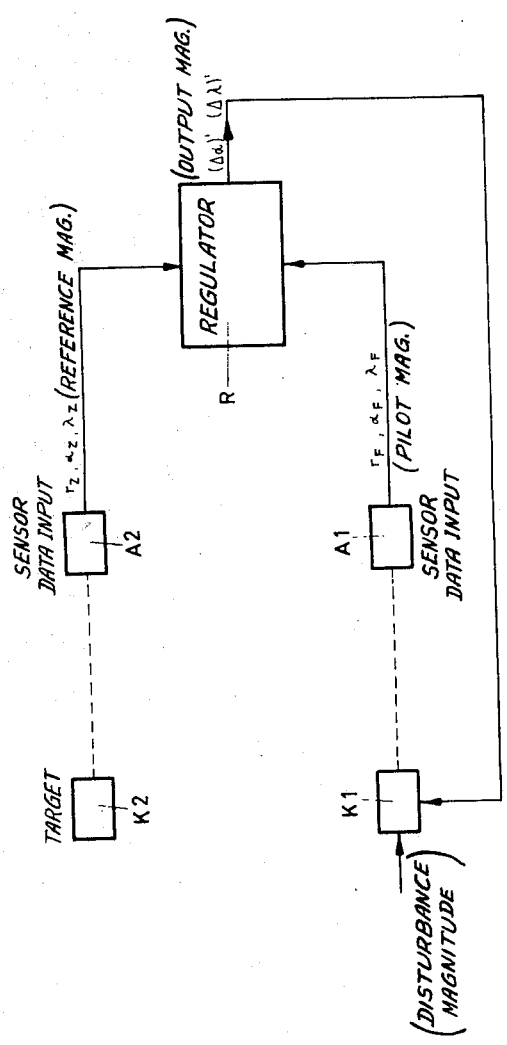
FIG. 2 is an explanatory block diagram of a regulating or feedback-control system according to the invention.

This principle can be satisfied by a feedback-control or regulation system as diagrammatically shown in FIG. 2. A regulator R, constituting the feedback path of a feedback-control system, more fully described below, is supplied with a variable datum magnitude constituted by the position information $r_Z$, $\alpha_Z$, $\lambda_Z$ of an object K2, for example a target Z, by means of a suitable sensor or data input device A2. The regulator R further receives, as pilot magnitude, the position information $r_F$, $\alpha_F$, $\lambda_F$ of an object K1, for example a missile F, through a sensor or data input device A1.

The input devices A1 and A2 may comprise radiation detectors such as radar or infrared (IR-) devices which are stationary or movable in space. In the regulator R at least one of the two positional informations is subjected to a time delay dependent upon a magnitude proportional to the time change of the quotient of the distance informations $r_Z$, $r_F$ of the respective two objects. The changes versus time $(\Delta\alpha)'$, $(\Delta\lambda)'$ of the differences of the angular coordinates $\alpha_Z$, $\lambda_Z$ for object K2 and the angular coordinates $\alpha_F$, $\lambda_F$ for object K1, are taken from the regulator R to constitute the regulator output magnitude and are supplied to the travel control member of object K1 constituting part of the forward path in the control system, which forward path is also influenced by the disturbance magnitude to be taken into account. Active as disturbance magnitude may be air currents and air friction, for example. The differences of the angular coordinates may have the following forms, depending upon which of the position informations are being delayed in the regulator:

$$\Delta\alpha = \alpha_Z - \alpha_F' \text{ or } \alpha_Z' - \alpha_F \text{ or } \alpha_Z' - \alpha_F'$$
$$\Delta\lambda = \lambda_Z - \lambda_F' \text{ or } \lambda_Z' - \lambda_F \text{ or } \lambda_Z' - \lambda_F'$$

Herein (') denotes a time delay which is dependent upon $$(r_Z/r_F)\cdot \text{ or } (r_Z'/r_F)\cdot \text{ or } (r_Z'/r_F')$$

Figure 3:
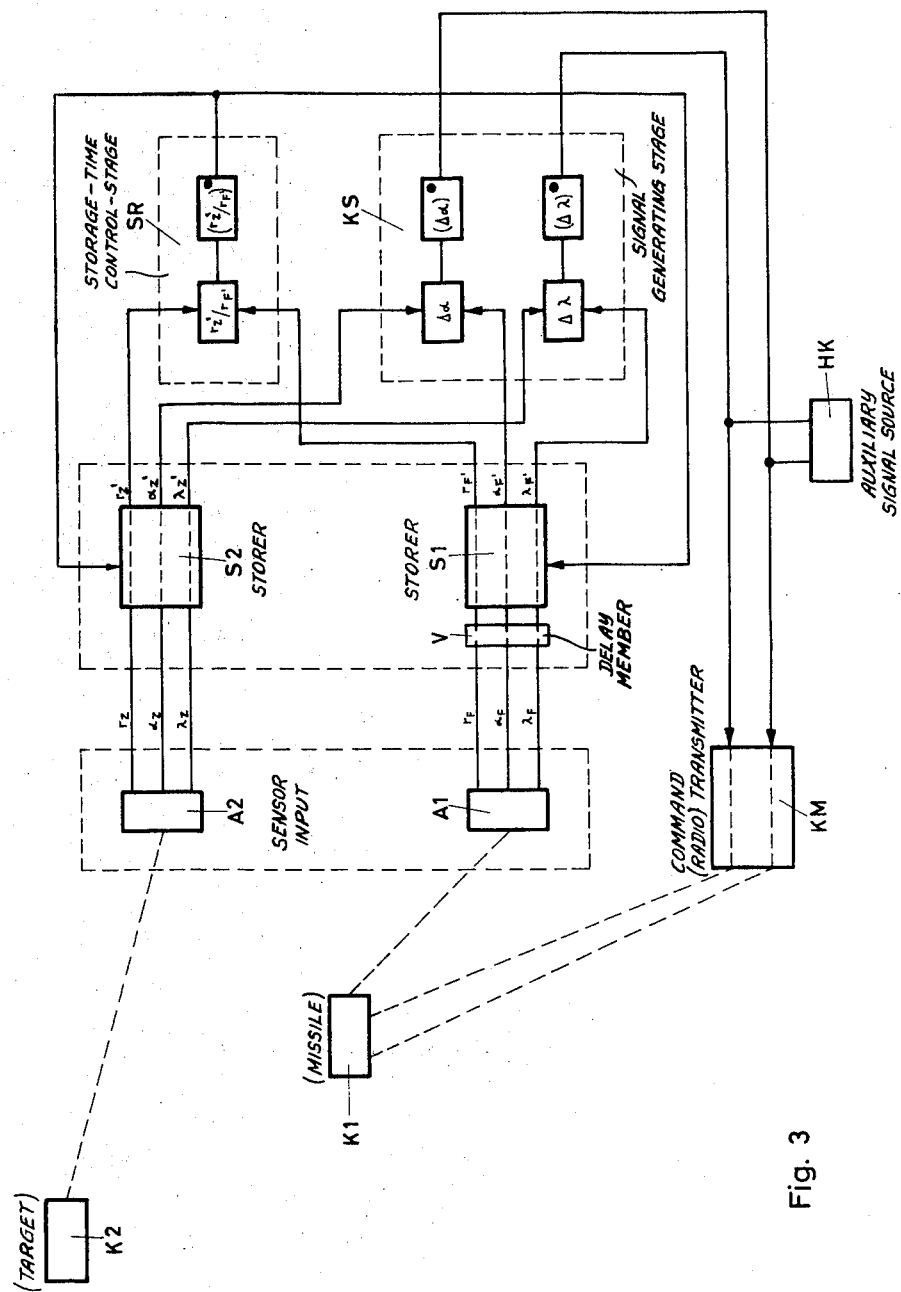
FIG. 3 shows schematically a specific example of a feedback-control system according to the invention.

FIG. 3 shows schematically a feedback-control system for realizing collision and anti-collision between two objects K1 and K2 in accordance with the regulating (feedback-control) method described above with reference to FIG. 2.

The object K1 may consist for example of a remotely controlled flying body such as aircraft or a guided missile, or it may constitute a forward visor of a gun such as an anti-aircraft gun. The object K2 may constitute a stationary or movable target, an obstacle or a remotely controlled vehicle. Assume first that object K1 is a remotely controlled aircraft and object K2 a stationary or moving target.

Connected to the aircraft-responsive sensor A1 is the input circuit of a memory, storage or storer member S1 which memorizes in a time-controllable manner the position information $r_F$, $\alpha_F$, $\lambda_F$ for aircraft K1 received as respective voltages from sensor A1. The memory member S1 may consist of a magnetic drum-type device, as will be described hereinafter with reference to FIG. 5. Connected to the target-responsive sensor A2 is the input circuit of a storer or storage member S2 corresponding to S1. A storage-time control stage SR, schematically shown in FIG. 3 and more fully described hereinafter with reference to FIG. 6, receives at its input circuit the delayed distance information $r_Z'$ from the target sensor A2 and also receives the delayed distance information $r_F'$ for missile K1 from the output of the memory member S1. The storage-time control stage SR first forms the quotient $r_Z'/r_F'$ and furnishes in its output circuit the time-dependent change $(r_Z'/r_F')\cdot$ of this quotient. This output circuit is connected with the drive of time-control elements of the memory members S1 and S2.

The input circuits of the command signal stage KS receive, correspondingly correlated, the delayed azimuth and elevation data $\alpha_Z'$ and $\lambda_Z'$ from the target sensor A2 and the delayed azimuth and elevation data $\alpha_F'$ and $\lambda_F'$ for missile K1 from the output circuit of memory member S1.

In the command signal stage KS similar first subtraction circuits S$\alpha$ and S$\lambda$ form the respective angle differences $\alpha_Z' - \alpha_F' = \Delta\alpha$ and $\lambda_Z' - \lambda_F' = \Delta\lambda$. Stage KS then furnishes by means of its differentiating circuits D$\alpha$ and D$\lambda$ the time changes $(\Delta\alpha)\cdot$ and $(\Delta\lambda)\cdot$ of these angle differences, which constitute the command signals for controlling the missile K1. The circuits S$\alpha$ and D$\alpha$ are shown in more detail in FIG. 7.

The output leads of the command signal stage KS are connected with a command signal transmitter KM which controls the missile K1 by radio in dependence upon the command signals. This has the effect that the steering devices of the missile are controlled in the sense required for weakening the command signals. The circuitry for the command signal stage KS and the signal radio transmitter KM are known as such and are not further described herein.

According to another embodiment contemplated by the invention, the position information $r_Z$, $\alpha_Z$, $\lambda_Z$ of object K2 furnished by the target sensor A2 can be transmitted undelayed to the stages SR and KS. The sensor A2 then provides in its output circuit the undelayed position information $r_Z$, $\alpha_Z$, $\lambda_Z$. The output stage of the storage-time control stage SR is then not connected with a storage-time control element of the storage or storer member S2. In this case the storage-time control stage SR forms the quotient $r_Z/r_F'$ and furnishes at its output circuit the time-rate of change of that quotient $(r_Z/r_F')\cdot$. The command signal stage KS forms the angle difference $\alpha_Z - \alpha_F' = \Delta\alpha$ and $\lambda_Z - \lambda_F' = \Delta\lambda$.

Double storing of positional data as first described becomes necessary if a single memorizing stage, in view of the spatial and temporal position and progression of the objects K1 and K2, would require negative data storing and consequently anticipation into the future. Since this excludes the law of causality, storing for anticipating future events, i.e. in complete spatial and time independence, can be achieved only if the information components of both objects are subjected to delay but in respectively different relation to time, and one of these data can thus be displaced with respect to the other into a relative future. The method of the invention, however, can also be performed by taking the memorized data, for example simulated position information, at least in part from a given program, rather than deriving the positional data exclusively from continuously memorized detection voltages or the like signals originating from the sensors.

The regulating system as described so far is suitable for guiding the travel-controlled object, for example a missile, on a collision course. If the regulating system is to be used for satisfying the anti-collision condition for the objects K1 and K2, an auxiliary command signal source HK is connected parallel to the input circuit of the command transmitter KM, this being shown in FIG. 3. The auxiliary signal source HK then impresses upon the commands furnished from the signal generating stage KS, a constant additional departure component.

Anti-collision between the two objects K2 and K1, of which at least one is remotely controlled by the regulating system, can also be secured by providing a time delay member V between one of the sensors and the appertaining storage or storer member. Such a delay stage may also be used conjointly with an auxiliary command signal source HK, as is shown in FIG. 3.

When employing the regulating system for antiaircraft (collision) control, the storage or storer member S1 is also preceded by the time delay member V so as to take into account the displacement between the missile or shell within the gun and the visor at a zero time "0." The delay member V may, for example, be in form of a magnetic memory device of the drum type, corresponding to that described hereinafter with reference to FIG. 5. The delay member V delays the position information $r_F$, $\alpha_F$, $\lambda_F$ of the body K1, in this case constituted by the forward visor of an antiaircraft gun, by the value $\tau_0$ for taking into account the gun constant for achieving the necessary timing synchronism. In this case the command signals are issued from the signal stage KS directly to the servomechanism control of the gun, which substitutes for the radio command transmitter KM shown in FIG. 3.

FIG. 4 serves for explaining the dimensioned application of the regulating system to antiaircraft control. An interception is diagrammatically represented with the aid of the interception triangle and by indicating mutual time relations. In this case, the object K1 is constituted by the forward visor, for example an infrared point (IR-visor) of a gun, and the object K2 is constituted by a moving target. The signal input or sensing device A1 is constituted by an IR-tracking device, and the signal input device A2 is constituted by a target-tracking radar. The servo-control at the gun and its barrel continuously operates, with the aid of the closed vision-regulating loop of the IR-tracking device A1, to reduce the command signal from regulator R, corresponding to the instantaneous coordinate departure, down to the zero value. Thus the target-interception condition remains satisfiable at any moment. The stability condition and consequently the target-intercept condition, as an invariant of the closed regulating system (loop), are met only if all command signals are zero. The performance in the regulator R, therefore, can be looked upon as constituting a time transformation. The position information $r_F$, $\alpha_F$, $\lambda_F$ available in form of electric signals from the IR-tracking device and resulting from the IR-point at the rod visor of the gun barrel, is first shifted from one time, the present, into another time, the past, by being delayed in the time-delay member V by a constant amount of time $\tau_0$. Thus, the delay in the time-delay member V takes into account that the IR-front visor of the gun, constituting a static model of the missile not yet fired, will mark the target K1 in space exactly at the location at which it would be located at the moment $\tau_0$, designating time "0" as the time zero point. The delay permits deriving from the present coincident with the moment $\tau_0$ the corresponding past at the time zero point "0." The delay member V places the position information $r_F$, $\alpha_F$, $\lambda_F$ of the IR-visor K1 and the position information of the target K2 upon a common time origin. That is, there occurs a time transformation in accordance with the required timing synchronism. The value $\tau_0$ is an apparatus constant and is related to the $v_0$-speed of the missile, as is apparent from the vector diagram of FIG. 4a. The base distance of the IR-visor K1 on the rod visor, projected onto the core axis of the gun is accurately equal to the distance which the missile can be imagined to have traversed, prior to being fired, in the time $\tau_0$. This distance is $$\vec{s} = \tau_0 \vec{v}_0$$

Furthermore, it will now be apparent which ballistic correction due to gravity is necessary. In the same interval of time, the missile would drop a distance $\frac{1}{2}\tau_0^2 g$, where $g$=gravity acceleration, perpendicularly from the gun-axis, which is the initial trajectory tangent, down to the point where the IR-visor point K2 is located in the above-mentioned base position and where it marks the missile at the time $\tau_0$.

Figure 5:
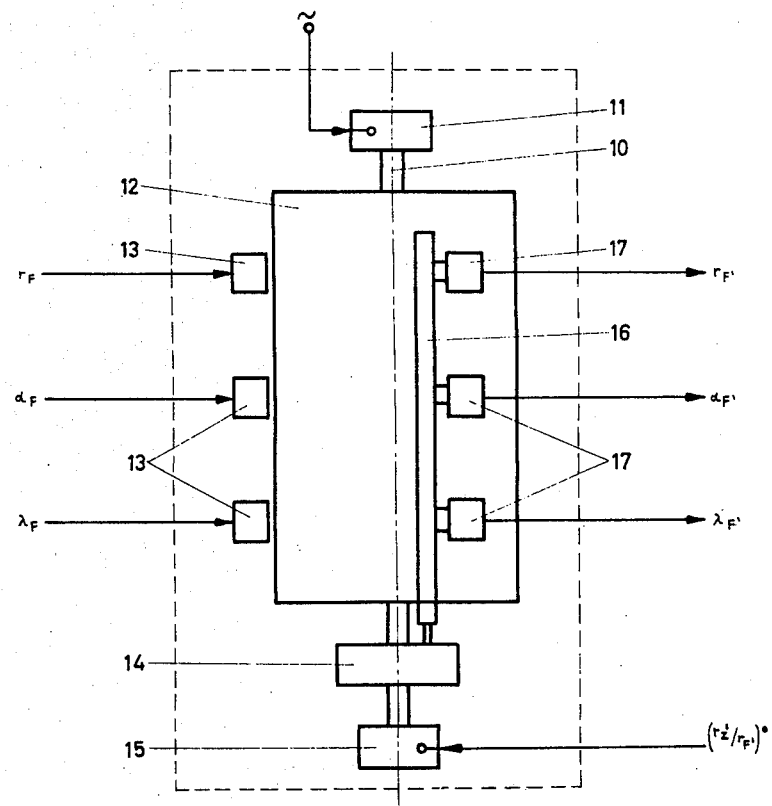
FIG. 5 shows schematically an example of a memory device for storing position information, two such devices being included in the system of FIG. 3.
Figure 5A:
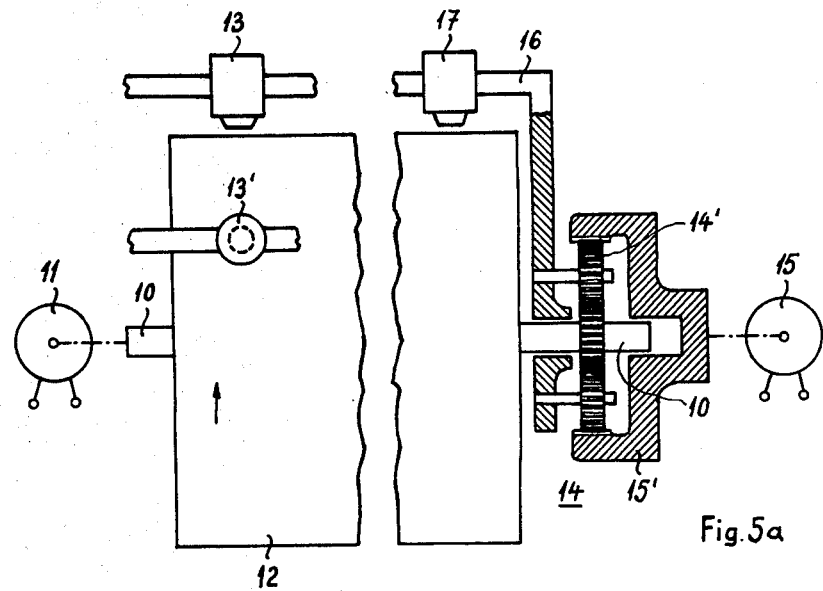
FIG. 5a is a partly sectional view of the same memory device.

FIGS. 5 and 5a show an example of one of the storage or storer members S1, S2 used as components of the above-described regulating system. The illustrated embodiment is of the magnetic drum type. A shaft 10, driven from a drive motor 11, carries a magnetizable drum 12 whose peripheral surface receives magnetic data-recording tracks. Mounted at the drum 12 and closely spaced from the drum surface are three recording heads 13 for receiving the respective position-information data $r_F$, $\alpha_F$, $\lambda_F$ of the object K2. Stationarily mounted beneath the respective recording heads are three erasing heads such as the one denoted by 13' in FIG. 5a. The shaft 10 also forms the bearing and equalizing gearing 14 which is connected with a drive 15 for positioning an arm 16. The drive 15 is controlled by the output signal $(r_Z'/r_F')$ of the storage-time control stage SR and acts upon equalizing gearing 14 which is shown to be of the planetary type. The arm 16 carries the shaft of the planet gears 14' which mesh with an orbit gear 15' driven from the drive 15 and also mesh with a sun gear fastened on shaft 10. The arm 16 carries three reproducer or read-out heads 17 whose respective positions correspond to those of the recording heads 13. The read-out heads furnish the delayed information signals $r_F'$, $\alpha_F'$, $\lambda_F'$ respectively.

Figure 6:
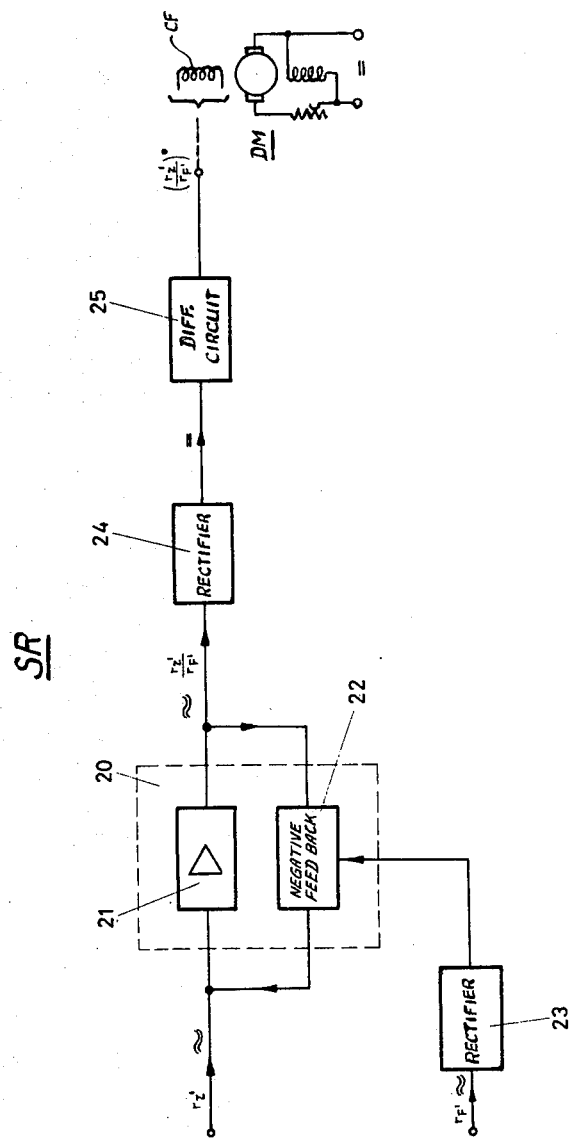
FIG. 6 is a block-type circuit diagram of a storage-time control stage forming part of the system according to FIG. 3.

FIG. 6 shows the block diagram of an example for the storage-time control stage SR which serves for forming the quotient of the distance information data $r_Z'$ and $r_F'$ and for furnishing a control signal proportional to the time-dependent change of this quotient. The illustrated storage-time control stage comprises an amplifier 20 composed of an amplifier proper 21 and a negative feedback circuit 22 connected parallel to the amplifier portion 21. Supplied to the input circuit of the amplifier 20 is the distance information $r_Z'$ as a dividend. The distance information $r_F'$ is supplied, as the divisor, to the feedback circuit 22 through a rectifier 23, so that the amplifier portion with its negative feedback controlled as a function of the divisor, furnishes in the output circuit a voltage proportional to the quotient $r_Z.../r_F'$. The output from amplifier 20 passes through another rectifier 24 to a time-differentiating circuit 25 whose output signal $(r_Z.../r_F')\cdot$ acts upon the control field CF of the direct-current motor DM moving the arm drive 15, thereby controlling the positional adjustment of the arm 16 with the read-out heads along the magnetic recording tracks on the memory drum 12 relative to the position of the respective recording heads 13, thus imposing a corresponding time delay of controlled magnitude upon the memorized position information data.

Denoting by $U_E$ the amplifier input voltage and by $U_A$ the output voltage, the following relations apply to the properties of the amplifier 20.

Amplification without negative feedback:

$$v_0 \cdot U_A = v_0 U_E$$

Amplification with negative feedback:

$$v = \frac{v_0}{1 + \beta v_0} \cong \frac{1}{\beta} (\beta v > 10)$$

Amplification with linear control of negative feedback in negative feedback circuit:

$$v = \frac{1}{k_\beta r_F'}$$

wherein $r_F'$ denotes the control current in the negative feedback circuit 22 and $k_\beta$ is the proportionality constant.

Since the input voltage $U_E$ of the amplifier 20 is proportional to $r_Z$, i.e. $U_E = k_v r_Z$, the output voltage $U_A$ can be expressed as follows:

$$U_A \cong \underbrace{\frac{1}{k_\beta r_F'}}_{v} \cdot U_E \cong \frac{1}{k_\beta r_F'} \cdot k_v r_Z' = k\left(\frac{r_Z'}{r_F'}\right)$$

Figure 7:
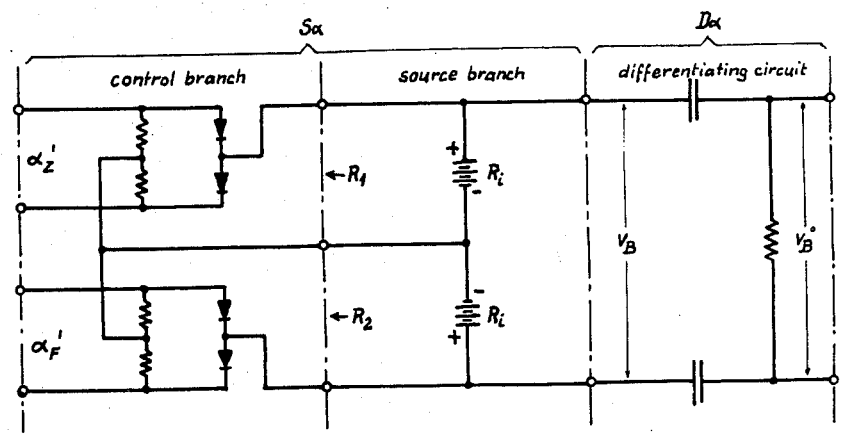
FIG. 7 is a schematic circuit diagram of part of the signal generating stage in FIG. 3.

FIG. 7 is a schematic diagram of the subtraction circuit $S\alpha$ and differentiating circuit $D\alpha$ in FIG. 3. The subtraction circuit comprises a control branch as shown and a source branch. When $R \gg R_1$, $R_2$ then the voltage $v_B$ is proportional to $(R_1 - R_2)$.

$$R_1 = f(\alpha_Z') \cong K_1 \alpha_Z'$$

$$R_2 = f(\alpha_F') \cong K_2 \alpha_F'$$

Thus $v_B$ proportional to $(\alpha_Z' - \alpha_F') = (\Delta \alpha)$. Thus $v_{B'}$ proportional to $(\Delta \alpha)\cdot$.

It will be understood that the storage-time control stage SR in a regulating system according to the invention may also be constituted by other quotient-forming networks known for such purposes, for example according to U.S. Patents No. 2,808,988 and 3,003,698.

With respect to system components not further described and illustrated herein because they are well known as such, reference may be had to known feedback control and regulating systems, including tracking-radar systems, guided-missile control systems, gun-laying systems. Among the literature available on such system components are the publications mentioned above.

It will therefore be understood that it will be obvious to those skilled in the art that my invention permits of a great variety of modifications and can be given embodiments other than particularly illustrated and described herein, without departing from the essential features of my invention and within the scope of the claims annexed hereto.

I claim:

1. The method of controlling the travel of a first object in dependence upon the position of a second object by means of a regulator having a travel control member for the first object, which comprises supplying the regulator with the positional information ($r_Z$, $\alpha_Z$, $\lambda_Z$) of the second object as reference magnitude and with the positional information ($r_F$, $\alpha_E$, $\lambda_F$) of the second object as the pilot magnitude, each of said positional informations being composed of a distance magnitude and two angular coordinates; delaying at least one of the positional informations in dependence upon a timing interval proportional to the time-dependent change of the quotient of the distance magnitudes ($r_Z$, $r_F$) of the respective bodies; and subsequently taking from the regulator as output magnitude the time differential of the differences between the angular coordinates of the second object and the respective angular-coordinate changes of the first object $$\left(\frac{d}{dt}\Delta\alpha, \frac{d}{dt}\Delta\lambda\right)$$

and applying said output magnitude in conjunction with a disturbance magnitude to said travel control member of said first object.

2. A system for controlling the travel of a first object in dependence upon the position of a second object by means of a regulator having a travel control member for the first object, comprising reference input means for providing the regulator with positional information ($r_Z$, $\alpha_Z$, $\lambda_Z$) of the second object to serve as reference magnitude, pilot input means for providing the regulator with positional information ($r_F$, $\alpha_F$, $\lambda_F$) of the first body to serve as pilot magnitude, each of said positional informations being composed of a distance-denoting magnitude ($r_Z$, $r_F$) and two angular coordinates ($\alpha_Z$, $\lambda_Z$ and $\alpha_F$, $\lambda_E$); said regulator having at least one memory stage connected to one of said input means for controllable time delay of the positional information of one of said objects and a storage-time control stage inputwise in connection with said two input means, said storage-time control stage having quotient forming means and differentiating means for providing a control magnitude proportional to the time change of the quotient of said respective distance magnitudes, said storage-time control stage being outputwise connected to said memory stage for controlling said time delay in dependence upon said control magnitude; said regulator further comprising a command signal generating stage having input circuits connected to said input means through said memory stage for forming command signals indicative of the time changes of the differences between the angular coordinates (such as $\alpha_Z - \alpha_F'$, $\lambda_Z - \lambda_F'$) of which those for at least said one body are delayed ($\alpha_F'$, $\lambda_F'$) by said memory stage; and signal transmitting means between said signal generating stage and said control member of said first object for causing said control member to control the travel of said first object in dependence upon said command signals.

3. A regulating system for controlling the travel of a remotely guided missile or the like in dependence upon the position of a target, comprising target data input means for providing positional information of the target to serve as reference magnitude, missile data input means for providing positional information of the missile as a pilot magnitude, each of said positional informations being composed of a distance-denoting magnitude and two angular coordinates; a memory stage connected to said missile data input means for controllable time delay of the missile positional information, a storage-time control stage having two input circuits connected to said target data input means and with said memory stage respectively to receive undelayed target distance information and delayed missile distance information, said storage-time control stage having quotient forming means and differentiating means for providing a control magnitude proportional to the time change of the quotient of said respective distance informations, and said storage-time control stage being outputwise connected to said memory stage for controlling said time delay in dependence upon said control magnitude; a command signal stage having input circuits connected to said target data input means and to said memory stage respectively so as to receive undelayed target angular coordinate information and delayed missile angular coordinate information, said command signal stage having output circuit means for providing command signals in accordance with the time changes of the annular differences ($\alpha_Z - \alpha_F'$ and $\lambda_Z - \lambda_F'$); and a signal transmitter connected to said output circuit means for transmitting said command signals to the missile to control its travel in the sense required to weaken said command signals.

4. In a control system according to claim 2, said first object being the front visor of a gun barrel and said second object being a target, said memory stage being connected to said pilot input means for storing the visor positional data, a pre-delay member interposed between said memory stage and said pilot input means for imposing upon the visor positional information an initial delay ($\tau_0$) to account for the gun constant; said regulator comprising a gun-laying servo-control of which said control member forms part, whereby said command signals cause said servo-control to operate in the signal-weakening sense.

5. A system for remotely controlling the travel of a first object in dependence upon the position of a second object according to claim 2, comprising an auxiliary signal source connected to said signal transmitting means and having a normally given output signal superimposed upon said command signals whereby said control member is controlled by the resultant of said command signals and auxiliary-source signals for guiding the first object in the sense of weakening said resultant signals to prevent collision of said two objects.

6. A system for remotely controlling the travel of a first object in dependence upon the position of a second object according to claim 2, comprising a pre-delay member interposed between said memory stage and said appertaining input means for preventing collision of said two objects.

7. In a control system according to claim 2, said memory stage comprising a rotatably driven magnetic data storage drum, three recording transducer heads closely spaced from the drum peripheral surface for magnetically recording distance and two angular coordinate data respectively, three eraser heads mounted ahead of said respective recording heads, a structure angularly displaceable about the drum axis away from and toward said recognizing heads, three read-out heads mounted on said structure for response to the data recorded by said respective recording heads, and drive means connected with said structure for displacing said structure to thereby vary the time delay between recording and read-out, said drive means being electrically connected to said storage-time control means to be controlled in dependence upon said control magnitude.

8. In a control system according to claim 7, said drive means comprising a drum shaft of normally constant speed, a differential-type gearing having an input gear on said shaft and having a second input gear and an intermediate output gear, speed-controllable actuating means connected with said second input gear and in electric connection with said storage-time control means to be speed-controlled in dependence upon said control magnitude, said output gear being connected to said structure for displacing said read-out heads.

9. In a control system according to claim 2, said storage-time control stage comprising an amplifying portion and a negative feedback portion of linear control characteristic connected parallel to said amplifying portion, said amplifying portion having an input circuit connected to one of said distance magnitudes to provide a dividend value of the quotient to be formed, a rectifier through which the other distance magnitude is connected to said feedback portion to provide the divisor for said quotient, said storage-time control stage having output leads whose voltage is proportional to said quotient, a differentiating circuit, and a rectifier connecting said differentiating circuit with said output leads, whereby said differentiating circuit furnishes said control voltage.

10. A control system according to claim 2, comprising a programming device for providing simulated positional information to serve in part as input data.

No references cited.

BENJAMIN A. BORCHELT, *Primary Examiner.*

W. C. ROCH, *Assistant Examiner.*